Patented July 11, 1944

2,353,556

UNITED STATES PATENT OFFICE 2,353,556

TREATMENT OF CHROME-TANNED LEATHER

John Marshall Grim, Stamford, and Joseph G. Niedercorn, Riverside, Conn., assignors to American Cyanamid Company, New York, N. Y., a corporation of Maine No Drawing. Application February 8, 1941, Serial No. 378,105

4 Claims. (Cl. 8—94.21)

This invention relates to the treatment of leather and more particularly to a process for bleaching or whitening of chrome tanned leather and to the leather products obtainable thereby.

According to the present invention, bleached or whitened chrome tanned leathers may be obtained by subjecting the chrome tanned leather to treatment with a hydrophile condensation product of ammeline and formaldehyde. Such condensation products and processes for their preparation are described and claimed in the application of J. M. Grim, Serial No. 376,849 filed Jan. 31, 1941.

As described in application Serial No. 376,849, these materials, which constitute the synthetic finishing agents of the present process, are condensation products of one mol of ammeline and about 2 to 4 mols of formaldehyde partially neutralized with an alkali of the group consisting of sodium and potassium hydroxides. Broadly stated, these condensation products may be prepared by reacting ammeline and formaldehyde in the proportions indicated and a sufficient amount of the alkali to form a water-soluble condensation product. The amount of the alkali required is dependent in each case upon the ratio of formaldehyde in the condensation product; the higher this ratio, the less alkali needed.

The synthetic tanning materials of the process of the present invention are characterized by being acid-sensitive and dilutable with water within a wide range without precipitation of the solid form of the condensation product.

Acid-sensitive water-soluble hydrophile ammeline-formaldehyde condensation products of one mol of ammeline and from about 2 to about 3 mols of formaldehyde may be prepared by heating a mixture of ammeline and formaldehyde in the indicated proportions and sodium or potassium hydroxide at a temperature of about 50 to 80° C., until a clear reaction mixture is obtained. The following specific examples illustrate the preparation of such products of the lower formaldehyde-ammeline ratio, the parts being by weight.

Example 1

A mixture of 31.8 parts (0.25 mol) of finely ground ammeline (100 mesh), 40.5 parts of 37% formalin (0.5 mol of formaldehyde) and 7 parts of sodium hydroxide in the form of a 10% solution, was heated to 50° C. The reaction mixture cleared up almost immediately. The syrupy product was water-soluble. The total quantity of alkali added amounted to about 22% on the weight of the ammeline employed.

Example 2

2702 parts (21.27 mols) of finely ground ammeline and 3909 parts of 37% formalin (48.26 mols of formaldehyde) were put into a stainless steel container. To these was added, with stirring, a solution of 675.6 parts of sodium hydroxide in 892.5 parts of water, and then an additional 892.5 parts of water, making a total of 1785 parts of water added. The amount of the alkali used was about 25% sodium hydroxide on the weight of the ammeline. The mixture was heated, with stirring, from an initial temperature of 70° C. to 80° C. in 40 minutes and maintained at this latter temperature with continued stirring for ½ hour. The reaction mixture was immediately filtered under suction and the filtrate made up to about 9072 parts with water.

A second batch was prepared in a similar manner employing 2650 parts (20.9 mols) of ammeline, 3909 parts of 37% formalin (48.26 mols of formaldehyde), 675.6 parts of sodium hydroxide and 1773 parts of water. The sodium hydroxide and the water were added to the ammeline and formaldehyde in the manner described above. The mixture was heated with stirring from an initial temperature of 72° C. to 80° C. in 20 minutes, the mixture being maintained at 80° C. for an additional 35 minutes. The reaction mixture was immediately filtered under suction, and the filtrate made up to 9008 parts with water. The amount of the alkali employed was about 25.5% on the weight of the ammeline. The two batches of the product were combined to give a syrup having a solid resin content of 50% based on the weight of ammeline, formaldehyde and water employed, and a pH of 11.6.

Example 3

A mixture of 31.8 parts (0.25 mols) of ammeline, 61 parts of 37% formalin (0.75 mol of formaldehyde), and 7.5 parts of sodium hydroxide in the form of a 10% solution was heated. The reaction mixture cleared up by the time the temperature reached 50° C. The product syrup which was water-soluble had a pH of about 11.3. The total quantity of alkali added amounted to about 23.58% on the weight of the ammeline employed.

The preparation of the water-dilutable hydrophile condensation products of higher formaldehyde ratio, i. e., from about 3 to 4 mols of formaldehyde per mol of ammeline, is illustrated by the following specific examples. In this procedure the ammeline and formaldehyde are first condensed by heating and the required amount of the alkali added to the resulting reaction mixture after a controlled cooling of the same. The reaction mixture is cooled before addition of the alkali in order to diminish or avoid reaction between any free formaldehyde present and the alkali, otherwise known as the Cannizzaro reaction, and in which part of the alkali is consumed to form sodium formate.

Example 4

A mixture of 31.8 parts (0.25 mol) of a finely ground (100 mesh) ammeline with 81 parts of 37% formalin (1 mol) was refluxed for 10 minutes after which the reaction mixture was cooled to 60° C. To this cooled mixture was added with stirring 0.5 part of sodium hydroxide in the form of a 10% aqueous solution, following which the mixture was further cooled to 25° C. To this cooled mixture was added an additional 0.5 part of sodium hydroxide in the form of a 10% solution and the resulting syrup was dilutable with water. The syrup had a pH of 7.05 and, on standing, formed a water-soluble gel. The total quantity of alkali added amounted to about 3.14% on the weight of the ammeline.

Example 5

31.8 parts (0.25 mol) of finely ground ammeline were mixed with 77.4 parts of 37% formalin (0.955 mol of formaldehyde) and the mixture refluxed for 10 minutes, whereupon it cleared up completely. After cooling the reaction mixture to 60° C., 0.3 part of sodium hydroxide in the form of a 10% solution were added thereto with stirring. The mixture was then cooled to 25° C. and 1.5 parts of sodium hydroxide added in the form of a 20% solution. The pH of the clear syrup was 7.1 and, on standing, formed a water-soluble gel. The total quantity of alkali employed was about 5.66% on the weight of the ammeline.

Example 6

31.8 parts (0.25 mol) of finely ground ammeline were mixed with 61 parts of 37% formalin (0.75 mol) and the mixture refluxed for 15 minutes. To the reaction mixture, after cooling to 85° C., was added 1 part of sodium hydroxide in the form of a 10% solution. When the temperature of the mixture dropped to below 50° C., another 1 part of sodium hydroxide in the form of a 10% solution was added. At 30° C. the mixture was practically completely water-soluble. The pH of the syrup was 8.1 and, on standing for about 24 hours, formed a water-soluble gel. The total amount of alkali employed was about 6.29% on the weight of the ammeline.

As mentioned above, the hydrophile condensation products have the property of being acid-sensitive. In the water-diluted condition they may be converted to the hydrophobe state by the addition of acid, with precipitation of a white solid resin.

It is known that the chrome salts in leather tanned therewith, will generate sulfuric acid when brought into contact with water.

By the process of the present invention the acid-sensitive property of the condensation products on the one hand and the capacity of the chrome-tanned leather to generate sulfuric acid in the presence of water on the other, may be availed of for the bleaching or whitening of the green color of chrome-tanned leather.

The process of the present invention is simple of application and in practice is carried out by drumming the chrome leather in a water solution of one of the described hydrophile condensation products. Since the condensation products are water soluble, they may be used in various concentrations, e. g. 2–10% solid resin on the weight of the shaved leather.

For a more complete understanding of the process of the present invention, the apparent mechanism of the bleaching or the whitening action will be explained. When the chrome-tanned leather is immersed in an aqueous solution, sulfuric acid and chromic sulfate diffuse slowly from the leather into the solution and into contact with the condensation product in such solution. Because of the acid-sensitivity of the condensation product, it is converted by the sulfuric acid to the hydrophobe state, precipitating as a white resin. By the continued drumming of the leather, this white resin is deposited in and on the fibriles of the leather, whitening or bleaching the same.

The application of these hydrophile ammeline-formaldehyde condensation products to the bleaching of chrome-tanned leather is illustrated by the following specific example, to which, however, the invention is not to be limited, and in which the parts are by weight.

Example 7

30 parts of moist chrome-tanned side leather was drummed for four hours at 50° C. in 30 parts of water containing 4.8 parts of the hydrophile ammeline-formaldehyde condensation product (50% solid resin), of Example 2. A whitened plump chrome leather containing the precipitated ammeline-formaldehyde hydrophobe resin was obtained.

While, in the foregoing example, the leather was drummed for four hours, it is to be understood that this time is given primarily by way of example, and that lesser periods of time may be employed. In general, the drumming time will depend upon the time required for exhaustion of the condensation product from the treating bath.

If desired, dilute acid may be added to the aqueous treating bath in any suitable manner to aid in the precipitation and hardening of the solid condensation products. The addition of acid should, however, be made with caution in order to avoid bleeding of the chrome tan from the leather. The addition of acid may take the form of pretreating the leather with the acid, draining, and drumming the pretreated leather with a solution of the condensation product. However, the acid is preferably added to the treating bath after the chrome leather has been in contact with the hydrophile product for a substantial length of time, i. e., after drumming for about one hour, the drumming of the leather being continued after the acid addition for about one half hour.

Example 8

As an instance of adding the acid in the preferred manner, 25 parts of moist chrome-tanned kip were drummed for one hour at 50° C. in 25 parts of water containing 4 parts of the hydrophile ammeline condensation products (50% of solid resin) of Example 2. To the treating bath there was then added about 2.5 parts of 10% acetic acid and the drumming was continued for an additional half hour.

This procedure was repeated except that about .6 part of 10% sulfuric acid were added in place of the acetic acid.

In each case a bleached leather of lighter color was obtained as compared with a blank from a similar treating bath to which acid had not been added, and the leather from the acetic acid treatment was of lighter color than that from the sulfuric acid treatment.

The amount of acid to be added will depend in each case upon the alkalinity of the hydrophile condensation products and on the acidity of the leather, as will be apparent to one skilled in the art of tanning.

The hydrophile condensation products may be employed alone for the whitening of chrome tanned leather, or in combination with other bleaching agents where these are suitable. In such instances, and as conditions may warrant, the leather may be first treated with the assisting bleaching agent and the hydrophile condensation product applied thereafter, or they may be used in conjunction with each other, or the former may be used in the after-treatment of the leather which has been bleached with the condensation products.

The leather products obtainable by the process of the present invention and having incorporated therein a white ammeline-formaldehyde resin, offer the advantage in the manufacture of white leather of a reduced requirement of white pigment, such as titanium dioxide, for covering the leather surface. Such bleached leathers may also be of advantage in obtaining brighter colors in dyeing. Incident to the bleaching of the chrome leather, a certain amount of filling will also be imparted thereto by the deposition of the white resin in the leather.

Suitable changes may be made in the invention without departing from the spirit and scope thereof as defined in the claims.

We claim:

1. A process of making leather which comprises impregnating chrome tanned leather with an aqueous solution of a water-dilutable, acid-sensitive condensation product of one mol of ammeline and about 2–4 mols of formaldehyde partially neutralized with an alkali of the group consisting of sodium and potassium hydroxides.

2. A process of making leather which comprices impregnating chrome tanned leather with an aqueous solution of a water-dilutable, acid-sensitive condensation product of one mol of ammeline and about 2–4 mols of formaldehyde partially neutralized with sodium hydroxide.

3. A process of making leather which comprises impregnating chrome tanned leather with an aqueous solution of a water-dilutable, acid-sensitive condensation product of one mol of ammeline and about 2–4 mols of formaldehyde partially neutralized with an alkali of the group consisting of sodium and potassium hydroxides, and adding acid to the solution to aid in the precipitation of the solid condensation product.

4. A process of making leather which comprises impregnating chrome tanned leather with an aqueous solution of a water-dilutable, acid-sensitive condensation product of one mol of ammeline and about 2–4 mols of formaldehyde partially neutralized with an alkali of the group consisting of sodium and potassium hydroxides, and adding acid to the solution to aid in the precipitation of the solid condensation product after the leather has been in contact with the solution for a substantial length of time and continuing the treatment of the leather with the solution after the addition of acid thereto.

JOHN MARSHALL GRIM.
JOSEPH G. NIEDERCORN.